United States Patent [19]

Torre et al.

[11] Patent Number: 5,321,119
[45] Date of Patent: Jun. 14, 1994

[54] IMPACT RESISTANT POLYAMIDE COMPOSITIONS

[75] Inventors: Hans D. Torre, Domat/Ems; Manfred Hoppe, Chur, both of Switzerland

[73] Assignee: Ems-Inventa AG, Switzerland

[21] Appl. No.: 27,453

[22] Filed: Mar. 8, 1993

Related U.S. Application Data

[63] Continuation of Ser. No. 673,963, Mar. 22, 1991, abandoned, which is a continuation-in-part of Ser. No. 89,736, Aug. 26, 1987, abandoned.

[30] Foreign Application Priority Data

Aug. 26, 1986 [CH] Switzerland ............ 03425/86

[51] Int. Cl.$^5$ .............................. C08G 69/26
[52] U.S. Cl. ......................... 528/338; 528/339; 528/340; 528/346; 528/347; 528/349
[58] Field of Search ................... 528/338, 340

[56] References Cited

U.S. PATENT DOCUMENTS 4,264,762  4/1981  Cordes et al. ............... 528/338

Primary Examiner—Ana L. Carrillo
Attorney, Agent, or Firm—Bierman and Muserlian

[57] ABSTRACT

A thermoplastic polyamide comprising a copolyamide which is the reaction product of a hexamethylene diamine unsubstituted or substituted with at least one alkyl group, and a bis(4-aminocyclohexyl) alkane which is substituted adjacent to the amino groups, and a dicarboxylic acid. Molded bodies made therefrom have high rigidity and tensile strength over a broad temperature range, low water uptake, high dimensional stability, low permeability to oxygen, and high distortion temperatures. They are particularly suitable for injection molding and extrusion particularly when they are modified to improved impact strength, especially for the preparation of thin walled or large surface area shapes.

6 Claims, No Drawings

IMPACT RESISTANT POLYAMIDE COMPOSITIONS

This Application is a continuation of U.S. patent applicaiton Ser. No. 673,963 filed Mar. 22, 1991, now abandoned, which is a continuation-in-part of U.S. patent application Ser. No. 089,736 filed Aug. 26, 1987, now abandoned.

FIELD OF THE INVENTION

The invention relates to thermoplastic moldable, polyamide compositions comprising copolyamides, particularly low-viscosity materials with high rigidity and tensile strength, which are readily processed in injection molding or blow molding extrusion apparatus.

STATE OF THE ART

U.S. Pat. No. 2,696,482 describes an amorphous polyamide derived from bis(4-aminocyclohexyl)methane and isophthalic acid which is unsuitable for processing in, for example, injection molding because its viscosity is too high. German Patent No. 1,795,464 discloses a process for the preparation of amorphous copolyamides from the combinations of alkyl-substituted hexamethylenediamines, isophtlialic acid and tere lithalic acid. These products also have viscosities so high that they are difficult to work.

U.S. Pat. No. 3,597,400 describes an amorphous copolyamide derived from bis(4-aminocyclohexyl)methane, hexamethylenediamines, isophthalic acid and terephthalic acid, in which the compositions having high proportions of bis(4-aminocyclohexyl) methane clearly exhibit high melt viscosities and therefore lend themselves poorly to processing, e.g., by injection molding. However, even at low diamine concentrations, viscosities are still sufficiently high that the preparation of large molded parts is difficult. According to U.S. Pat. No. 4,369,305, copolyamide compositions with viscosities below 30,000 poise at 280° C. and a shear value of $10^5$ dyn/cm$^2$ are obtained if the composition contains particular proportions of iso- and terephthalic acids, very low proportions of bis(4-aminocyclohexyl)methane in a particular mixture of isomers; viz. at least 59% by weight trans/trans or cis/trans isomers.

U.S. Pat. No. 4,536,541 describes an amorphous copolyamide which also includes a small amount of bis(4-aminocyclohexyl)methane isomers and is modified for impact-resistance with a particular ethylene/-propylene/diene copolymer (EPDM) activated with succinic acid. It is known that, if impact-resistant modifiers of this type are worked into polyamides, they considerably increase the welt viscosity (U.S. Pat. No. 4,174,538 and German Patent No. 1,242,606), so that the processing of such polyamides is again made more difficult. By contrast, a reduction of the amount of bis(4-aminocyclohexyl) methane in the amorphous copolyamide has the effect of reducing the retention of form on heating and deteriorates certain mechanical properties; e.g., viscosity and strength.

British Patent No. 998,439 describes the introduction of modified polyolefins and polyacrylates into linear, partially crystalline polyamides to modify impact-resistance. Impact resistance modification using particular reactive copolyolefins is described in detail in German DE-A-2,722,270 for the polyamides PA 6 and PA 66. However, partially-crystalline polyamides have a very low melt viscosity and the increase in viscosity due to the modification causes no problem in processing thermoplastic compositions of this type.

U.S. Pat. No. 4,339,555 describes the modification of conventional homopolyamides with particular copolylefins which contain, in addition, urea derivatives for the improvement of the melt and forming processes.

British Patent No. 2,170,209 discloses a transparent copolyamide derived from a dicarboxylic acid such as isophthalic acid and a diamine component comprising bis(4-amino-3,5-diethylcyclohexyl)-methane as well as other polyamide-forming components. British Patent Application No. 86-29,928 discloses a similar product, but one in which the principal diamine is bis(4-amino-3-ethyl-5-methylcyclohexyl) methane.

OBJECTS OF THE INVENTION

It is an object of the invention to overcome the foregoing disadvantages for polyamide and copolyamide compositions, and to provide particular readily-workable, low viscosity alloys having good properties in use.

This and other objects and advantages of the invention will become obvious from the following detailed description.

SUMMARY OF THE INVENTION

The thermoplastic polyamides of the invention are comprised of an amorphous copolyamide derived from (1) at least one hexamethylene diamine which may be substituted with at least one alkyl; (2) at least one cyclic diamine of the formula

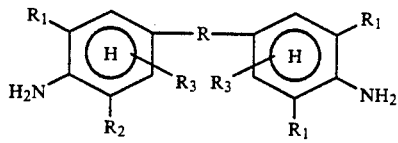

wherein R is an alkylene group having 1 to 4 carbon atoms and $R_1$, $R_2$ and $R_3$ are individually hydrogen or a substituent with the proviso that $R_1$ and $R_2$ are not both hydrogen; and (3) at least one dicarboxylic acid.

DETAILED DESCRIPTION OF THE INVENTION

It has been found that a particular combination of compounds and substituents will produce molding compositions having surprisingly superior characteristics, particularly the use of hexamethylene diamine and isophthalic acid or an aliphatic dicarboxylic acid is satisfactory. In the case of isophthalic acid, terephthalic acid may also be included. The additional amine component is a bis(4-aminocyclobexyl) methane which has been substituted in the 3 and/or 5 positions. It is believed that the amino groups of the cyclic diamines are sterically influenced by the presence of the substituents and therefore, by selecting a suitable mixture of isomers, it is possible to regulate the viscosity of the ultimate copolyamide.

The copolyamide preferably contains 20 to 48, more preferably 25 to 45, mole % of the hexamethylenediamine, 30 to 2, more preferably 25 to 5, mole % of the cyclic diamine and a substantially equimolar amount of said dicarboxylic acid based on the total amount of amine components.

Cycloaliphatic amines which are useful in the present invention include bis(4-amino-3-methyl-5-ethylcyclohexyl-methane,
bis(4-amino-3,5-diethylcyclohexyl)methane,
bis(4-amino-3-methyl-5-isopropylcyclohexyl)methane,
bis(4-amino-3,5-diisopropylcyclohexyl)methane,
bis(4-amino-3,5-dimethylcyclohexyl)methane,
bis(4-amino-3-methylcyclohexyl)methane,
bis(4-amino-3-ethylcyclohexyl)methane, and
bis(4-amino-3-isopropylcyclohexyl)methane.

Other cycloaliphatic diamines may be used which are essentially variants of those set forth above. For example, there may be additional alkyl substituents on the cyclohexane rings or the $CH_2$ group between the rings may be replaced by an alkylene chain having 2 to 4 carbon atoms. In particular, ethylene, propylene, isopropylene, or butylene, is suitable. It is preferable that the alkyl groups on the rings have 1 to 8 carbon atoms. More preferably, they should have 1 to 4 carbon atoms and, most preferably, I to 3 carbon atoms. It has been found particularly advantageous if the alkyl groups on the rings are a combination of methyl with ethyl or isopropyl groups. Of course, mixtures of diamines may also be used.

The presence of the cyclic diamines not only reduces the viscosity of the copolyamide and its blend to a level of less than 1500 270° C., but it also provides a number of additional advantages. It has been found that the ability of the molded product to retain its shape, especially under heating, has been greatly increased. The new compositions provide increased stiffness independent of the conditioning e.g. through the higher values of the tensile module (DIN 53 457)—wore than $3000N/mm^2$ measured at room temperature and more than $1500N/mm^2$ measured at 120° C.—and tensile strength values (DIN 53 455):

at yield, increased to $>100N/mm^2$ and
at break, increased to $>70N/mm^2$.

Furthermore, reduced water uptake is also achieved. In addition, the molded shapes exhibit much high heat distortion temperatures (resulting from higher glass transition temperatures) adequate for DIN 53 461 - load $1.8N/mm^2$ higher than 120° C., load $0.46N/mm^2$ higher than 1300° C. and especially low permeability to oxygen.

The content of the cyclic diamines is varied to obtain the desired viscosity, but should be at least 2% by weight, based on the total diamine content. Increasing amounts of terephthalic acid will also increase the viscosity of the polymer. Therefore, terephthalic acid should not constitute more than 10% of the total dicarboxylic acid present by weight.

The compositions of the present invention may also contain the usual additives such as fillers, reinforcing agents, pigments, dyes, heat stabilizers, anti-oxidants, UV protective agents, plasticizers, and/or nucleation agents. They can also be blended or reacted with other polymers, especially with impact modifiers, in ways known to the person of ordinary skill.

The polyamides of the present invention are particularly suitable for processing in extrusion and injection molding machines, especially for the preparation of shapes having large surface areas or large volumes. Vehicle bodies, machine covers, and protective parts are examples of such shapes. The compositions can also be used for the preparation of dimensionally stable components, wire and lightwave guide claddings, and thin-walled shapes having small cross-sections.

In the following examples there are described several preferred embodiments to illustrate the invention. However, it is to be understood that the invention is not intended to be limited to the specific embodiments.

Solution viscosities were measured as a 0.5% w/v solution in m-cresol, melt viscosities were measured at 270° C./122.6N. Tg is the glass transition temperature. The characteristics of the copolyamide test bodies are shown in Table 1.

EXAMPLE 1

376.5 g of isophthalic acid (47.7 mol %), 395.5 g of 60% aqueous hexamethylenediamine solution (43.0 mol %), 118.0 g of bis(4-amino-3,5-diethylcyclohexyl)methane (7.8 mol %), and 8.7 g of benzoic acid (1.5 mol %) were charged into a reaction vessel at 180° C., and then heated for 1 hour at 250° C., with stirring under a nitrogen blanket. The water of reaction (c.182.0 ml) obtained in the polycondensation was separated and collected, and the temperature was then maintained at 285° C. for 4.5 hours. The resultant polymer was completely transparent, had solution viscosity of 1.529 and a melt viscosity of 912 Pa.'s. Tg was 138° C.

EXAMPLE 2

357.3 g of isophthalic acid (42.6 mol 15.0 mg of benzoic acid (2.4 mol %), 40.0 g of terephthalic acid (4.8 mol %), 102.0 g of bis(4-amino-3-methyl-S-ethylcyclohexyl)-methane (6.9 mol %) and 254.0 g of hexamethylenediamine (43.3 mol %) were introduced into i reaction vessel and gradually heated to 180° C. with stirring under a nitrogen blanket. After separating the water of reaction, the reaction mixture was heated to 285° C. for 3 hours and cooled. The glass clear polycondensation product had a solution viscosity $\eta rel = 1.628$ and a melt viscosity of 1212 Pa.'s. Tg was 152° C.

EXAMPLE 3

273.0 g of isophthalic acid (39.9 mol 85.0 g of dodecanedicarboxylic acid (8.9 mol %), 125.0 g of hexamethylenediamine (26 .1 mol % and 333 .0 g of bis (4-amino,-3 , 5-diethyl cyclohexyl)methane (25.1 mol %) were polycondensed at 285 0C. The relative solution viscosity of the transparent polycondensate was 1.504, the melt viscosity was 680 Pa.'s, and Tg was 165° C.

EXAMPLE 4

21.3 kg of isophthalic acid (42.42 mol 3.4 kg of terephthalic acid (6.86 mol %), 26.15 kg of a 60.4% aqueous hexamethylenediamine solution (45 mol %), 3.58 kg of bis(4-amino-3-methylcyclobexyl)methane (4.97 mol %), 400 g of stearic acid (0.74 mol %) and 5 liters of water were heated in a 150 liter autoclave with stirring to 260° C. After releasing pressure in the autoclave, the contents were polycondensed under nitrogen at 290° C., the polycondensate was taken off as a strand through a water bath, and granulated. The glass-clear granulate had a solution viscosity of 1.589, a melt viscosity of 1158 Pa.'s and Tg of 143° C. The water uptake was after 30 days storage in water at 25° .

TABLE 1

|  | DIN | Units | Example 1 | Example 2 | Example 3 | Example 4 | Example 5 |
|---|---|---|---|---|---|---|---|
| Glass transition temperature. |  | °C. | 138 | 152 | 165 | 143 | 140 |
| Relative solution viscosity at 20° C. |  |  | 1.53 | 1.63 | 1.50 | 1.59 | 1.57 |
| Melt viscosity, 270°/122, 6 N |  | Pa's | 912 | 1212 | 680 | 1158 | 840 |
| Tensile modulus. | 53457 | N/mm² | 3100 | 3100 | 3000 | 3300 | 3250 |
| Tensile strength at yield. | 53455 | N/mm² | 105 | 107 | 100 | 112 | 104 |
| Tensile strength at break. | 53455 | N/mm² | 78 | 78 | 72 | 83 | 80 |
| Heat distortion temperature. | 53461 |  |  |  |  |  |  |
| Load 1.8 N/mm² |  | °C. | 126 | 140 | 150 | 126 | 128 |
| 0.46 N/mm² |  | °C. | 135 | 148 | 156 | 136 | 135 |
| Impact resistance. Dry & conditioned. | 53453 | kJ/m² |  |  | No break |  |  |
| Notched impact resistance. Dry & conditioned. | 53453 | kJ/m² | 4 | 5 | 7 | — | 2.3 |

(Pa's = Pascal · seconds.)

EXAMPLE 5

2.8 kg of isophthalic acid (41.1 mol 0.52 kg of terephthalic acid (7.4 mol %), 2.07 kg of hexamethylenediamine (43.4 mol %), 0.83 kg (7.1 mol %) of bis(4-amino-3,5.diethylcyclohexyl)methane, and 50 g (1 mol %) of benzoic acid were polycondensed in a 20 liter autoclave at 285° C. The resultant polycondensate had a solution viscosity of 1.574, a melt viscosity of 840 Pa.'s and Tg of 140° C.

EXAMPLE 6 (Comparative)

Bis(4-aminocyclohexyl)methane having an isomeric distribution of 36% by weight trans/trans, 45% by weight cis/trans and 9% by weight cis/cis was used. 15.0 kg of isophthalic acid (44.14 mol %), 1.60 kg of terephthalic acid (4.7 mol %), 10.3 kg of hexamethylenediamine (43.3 mol %), 3 kg of bis(4-aminocyclohexyl)methane (6.97 mol %), and 0.22 kg of benzoic acid (0.89 mol %) were polycondensed in a 20 liter autoclave at 280° C. The copolyamide was drawn off as a transparent strand and granulated. It had a solution viscosity of 1.539 and a high melt viscosity of 2974 Pa.'s.

The physical characteristics of the copolyamide were as follows:

| Tg | 135° C. |
|---|---|
| Flexural Strength | 165 N/mm² |
| Impact Resistance | 60% no break 40% 53 kJ/m² |
| Notched Impact Resistance | 1.6 kJ/m² |
| Bending E Modulus | 3100 N/mm² |
| Tensile Strength at break | 50% 102 N/mm² 50% 70 N/mm² |

EXAMPLE 7 (Comparative)

Bis(4-aminocyclohexyl)methane having an isomeric distribution of 54% by weight trans/trans, 40% by weight cis/trans and by weight cis/cis was used. 2.98 kg of isophthalic acid (44.0 mol %), 0.341 kg (5 mol %) of terephthaic acid (5.0 mol %) 2.07 kg of hexamethylendiamine (43.7 mol %) 0.55 kg (6.5 mol %) bis(4-aminocyclohexyl)methane, and 40 g of benzoic acid (0.8 mol %) were polycondensed in a 20 liter autoclave to give a transparent copolyamide. The viscosity rose extremely quickly and the autoclave could only be emptied with difficulty. The relative solution viscosity was 1.68 and the melt viscosity 7640 Pa.'s.

EXAMPLE 8 (Comparative)

The procedure of Example 5 was followed except that the following were used:
- 2.90S kg (35 mol %) Isophthalic Acid
- 1.240 kg (15 mol %) Terephthalic Acid
- 2.800 kg (48 mol %) Hexamethylene diamine
- 0.220 kg (2 mol %) bis(4-aminocyclohexyl)methane
- 0.005 kg (0.03 mol stearic acid
- 280° C. reaction temperature Solution viscosity was 1.512, melt viscosity was 3240 Pa.'s (at 270° C./122.6N), and Tg was 126° C. No test bodies could be produced, nor could the material be compounded because of viscosity increase.

EXAMPLE 9 (Comparative)

The procedure of Example 8 was followed except that the following were used:
- 4.780 kg (42 mol %) IPA Isophthalic acid
- 0.910 kg (8 mol %) TPA Terephthalic acid
- 3.600 kg (45 mol %) HMD Hexamethylene diamine
- 0.720 kg (5 mol %) bis(4-aminocyclohexyl)methane
- 0.030 kg (0.15 mol %) stearic acid Solution viscosity was 1.47, melt viscosity was 2900 Pa.'s (at 270/122.6N), and Tg was 133° C. No test bodies could be produced, nor could the material be compounded because of viscosity increase.

Various modifications of the copolyamide of the invention may be made without departing from the spirit or scope thereof and it is to be understood that the invention is intended to be limited only as defined in the appended claims

What we claim is:

1. A thermoplastic polyamide having a melt viscosity of less than 1500 Pa.s at 270° C. and a tensile strength greater than 100 N/mm² at yield comprising an amorphous copolyamide derived from a) 42.2 to 45.03 mol % of hexamethylene diamine; b) 4.97 to 7.8 mol % of at least one cyclic diamine of the formula

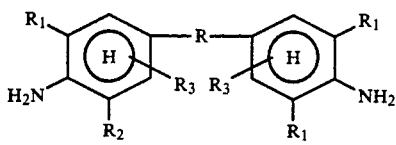

wherein R is alkylene of 1 to 4 carbon atoms; $R_1$, $R_2$ and $R_3$ are individually hydrogen or alkyl of 1 to 8 carbon atoms with the proviso that $R_1$ and $R_2$ are not both hydrogen; and c) 50 mol % of isophthalic acid or isophthalic acid with up to 10% by weight of terephthalic acid based on the total dicarboxylic acid equimolar with the total of said hexamethylene diamine and said cyclic diamine for a total mol % of 100.

2. The composition of claim 1 wherein the cyclic diamine is selected from the group consisting of bis(4-amino-3-methyl-5-ethylcyclohexyl)methane, bis(4-amino-3,5-diethylcyclohexyl)methane, bis(4-amino-3-methyl-5-isopropylcyclohexyl)methane, bis(4-amino-3,5-diisopropyl-cyclohexyl)methane, bis(4-amino-3,5-dimethylcyclohexyl)methane, bis(4-amino-3-methylcyclohexyl)methane, bis(4-amino-3-ethylcyclohexyl)methane, and bis(4-amino-3-isopropylcyclohexyl)methane.

3. The composition of claim 1 wherein $R_1$, $R_2$, and $R_3$ are alkyl of 1 to 4 carbon atoms.

4. The composition of claim 1 wherein $R_1$, $R_2$, and $R_3$ are alkyl of 1 to 3 carbon atoms.

5. The composition of claim 1 wherein one of $R_1$ or $R_2$ is methyl and the other is ethyl, isopropyl, or hydrogen.

6. A polyamide of claim 1 having tensile modulus values greater than 3000N/mm$^2$ measured at room temperature and reduced water uptake.

* * * * *